(12) United States Patent
Fox et al.

(10) Patent No.: US 9,073,539 B1
(45) Date of Patent: Jul. 7, 2015

(54) AUXILIARY BATTERY POWERED BRAKE RELEASE ASSEMBLY

(75) Inventors: Ivan Eugene Fox, Mattoon, IL (US); Brian Laymon, Mattoon, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 761 days.

(21) Appl. No.: 13/166,653

(22) Filed: Jun. 22, 2011

Related U.S. Application Data

(60) Provisional application No. 61/357,341, filed on Jun. 22, 2010.

(51) Int. Cl.
| | |
|---|---|
| *B60K 1/02* | (2006.01) |
| *B60W 10/18* | (2012.01) |
| *B60W 10/184* | (2012.01) |

(52) U.S. Cl.
CPC .................................. *B60W 10/184* (2013.01)

(58) Field of Classification Search
USPC ............ 180/65.1, 65.6, 65.8, 65.51; 188/3 R, 188/156, 72.1, 1.11 E
See application file for complete search history.

(56) References Cited

U.S. PATENT DOCUMENTS

| | | | | |
|---|---|---|---|---|
| 1,896,963 | A | * | 2/1933 | Leventis ........................ 188/3 R |
| 2,330,739 | A | * | 9/1943 | Piron ............................ 188/170 |
| 2,350,636 | A | * | 6/1944 | Piron ............................ 188/173 |
| 2,832,426 | A | * | 4/1958 | Seargeant ........................ 180/2.1 |
| 3,738,710 | A | * | 6/1973 | Pokrinchak et al. ............ 303/20 |
| 3,892,296 | A | | 7/1975 | DePuydt et al. |
| 3,914,938 | A | | 10/1975 | Cornell et al. |
| 4,722,576 | A | * | 2/1988 | Matsuda ................... 303/122.05 |
| 5,253,724 | A | * | 10/1993 | Prior ................................. 180/6.5 |
| 5,381,314 | A | | 1/1995 | Rudy et al. |
| 5,406,778 | A | | 4/1995 | Lamb et al. |
| 5,542,251 | A | | 8/1996 | Leibing et al. |
| 5,619,111 | A | | 4/1997 | Katagiri et al. |
| 5,735,407 | A | | 4/1998 | Kallio |
| 5,794,422 | A | | 8/1998 | Reimers et al. |
| 5,823,798 | A | | 10/1998 | Zintler et al. |
| 5,912,801 | A | | 6/1999 | Roy et al. |
| 5,934,051 | A | | 8/1999 | Hahn |

(Continued)

FOREIGN PATENT DOCUMENTS

| | | |
|---|---|---|
| DE | 4224359 C1 | 5/1993 |
| DE | 10148326 A1 | 4/2003 |

(Continued)

OTHER PUBLICATIONS

Tractors: Specifications; Electric Lawn Tractors and Conversion Kits; Nov. 19, 2006; http://electriclawntractor.com.

(Continued)

*Primary Examiner* — J. Allen Shriver, II
*Assistant Examiner* — Bridget Avery
(74) *Attorney, Agent, or Firm* — Neal, Gerber & Eisenberg LLP

(57) ABSTRACT

A vehicle connectable to an auxiliary power unit capable of energizing a pair of fail-safe brakes that arrest rotation of a pair of electric transaxles mounted to the vehicle. Each brake has an external connector and requires electrical power to assume a non-braked state that permits free rotation of an electric motor engaged to the brake and incorporated in each of the electric transaxles. The auxiliary power unit having first and second circuits and first and second connectors compatible with the external connectors of one of the brakes.

16 Claims, 3 Drawing Sheets

(56) References Cited

U.S. PATENT DOCUMENTS

| | | | |
|---|---|---|---|
| 6,082,084 | A | 7/2000 | Reimers et al. |
| 6,109,009 | A | 8/2000 | Benson |
| 6,242,873 | B1 | 6/2001 | Drozdz et al. |
| 6,264,228 | B1 | 7/2001 | Westervelt |
| 6,280,004 | B1 | 8/2001 | Greaves, Jr. |
| 6,388,879 | B1 | 5/2002 | Otaguro et al. |
| 6,431,879 | B2 | 8/2002 | Brekosky et al. |
| 6,450,587 | B1* | 9/2002 | MacGregor et al. .......... 303/89 |
| 6,523,334 | B1 | 2/2003 | Dettmann |
| 6,609,357 | B1 | 8/2003 | Davis et al. |
| 6,864,646 | B2 | 3/2005 | Rahman et al. |
| 7,007,446 | B2 | 3/2006 | Dettmann |
| 7,017,327 | B2 | 3/2006 | Hunt et al. |
| 7,075,796 | B1 | 7/2006 | Pritchett |
| 7,126,237 | B2 | 10/2006 | Walters et al. |
| 7,280,356 | B2 | 10/2007 | Pfahnl et al. |
| 7,347,507 | B1* | 3/2008 | Stillinger ..................... 303/7 |
| 7,688,573 | B2 | 3/2010 | Ranta |
| 8,182,050 | B2* | 5/2012 | Jackson et al. ............. 303/192 |
| 2001/0056544 | A1* | 12/2001 | Walker ...................... 713/200 |
| 2004/0124026 | A1 | 7/2004 | Walters et al. |
| 2004/0124697 | A1* | 7/2004 | MacGregor et al. .......... 303/89 |
| 2004/0160201 | A1 | 8/2004 | Rahman et al. |
| 2005/0127747 | A1* | 6/2005 | Robertson .................... 303/20 |
| 2006/0059879 | A1 | 3/2006 | Edmond |
| 2007/0216217 | A1 | 9/2007 | Clark et al. |
| 2008/0179860 | A1 | 7/2008 | Bell |
| 2008/0234096 | A1 | 9/2008 | Joshi et al. |
| 2008/0289309 | A1 | 11/2008 | Gust et al. |
| 2009/0000839 | A1 | 1/2009 | Ishii et al. |
| 2009/0065273 | A1 | 3/2009 | Wyatt et al. |
| 2009/0069964 | A1 | 3/2009 | Wyatt et al. |
| 2009/0114461 | A1 | 5/2009 | Clark et al. |

FOREIGN PATENT DOCUMENTS

| | | |
|---|---|---|
| EP | 0151208 | 8/1985 |
| EP | 1151892 A3 | 11/2001 |
| EP | 1327547 A2 | 7/2003 |
| EP | 1645456 A3 | 7/2006 |
| JP | 2001320807 A | 11/2001 |
| JP | 2003291692 A | 10/2003 |
| JP | 2004100718 A | 4/2004 |
| JP | 2007037366 A | 2/2007 |
| WO | 2006039520 A1 | 4/2006 |
| WO | 2006039521 A1 | 4/2006 |
| WO | 2009036208 A1 | 3/2009 |
| WO | 2009036211 A2 | 3/2009 |
| WO | 2009036211 A3 | 3/2009 |
| WO | 2010048561 A2 | 4/2010 |
| WO | 2010048561 A3 | 4/2010 |

OTHER PUBLICATIONS

Edmond Electric Company Ltd.; Patent Pending, Tested and Proven Design . . . ; Electric Lawn Tractors and Conversion Kits—Patent Pending, Tested and Proven Design; Apr. 25, 2007; pp. 1-2; http://electriclawntractor.com/index.php?option=com_content&task=view&id=19&Itemid . . . .

Jacobsen, A Textron Company; Jacobsen E-Walk, Walking Green Mowers, pp. 1-2; Version 3.0; Jan. 2007.

Jacobsen, A Textron Company; Jacobsen E-Plex II, Riding Greens Mowers; pp. 1.2; Version 3.0; Jan. 2007.

Jacobsen, A Textron Company; The Toro Company, Mid-Duty Specifications: Electric e2065 Workman; Toro-Golf Course Management Workman, Apr. 24, 2007; http://www.toro.com/golf/vehicle/workman/midduty/e2065_specs.html.

Written Opinion of the International Searching Authority dated Mar. 12, 2008 in connection with International Application No. PCT/US2008/076069.

Written Opinion of the International Searching Authority dated on Jun. 4, 2010 in connection with International Application No. PCT/US2009/061929.

Written Opinion of the International Searching Authority dated Mar. 20, 2009 in connection with International Application No. PCT/US2008/076072.

European Office Action dated Jun. 29, 2009 in connection with European Patent Application No. 07 799 218.8.

* cited by examiner

AUXILIARY BATTERY POWERED BRAKE RELEASE ASSEMBLY

CROSS REFERENCE

This application claims the benefit of U.S. Provisional Patent Application No. 61/357,341 filed on Jun. 22, 2010, which is incorporated herein in its entirety.

FIELD OF THE INVENTION

This invention relates to component assemblies for electric drive systems for self-propelled vehicles or machines, and is particularly useful for brake release mechanisms for electric drives used in self-propelled vehicles or machines such as lawn mowers, snow-throwers, and lawn or garden tractors.

BACKGROUND OF THE INVENTION

Self-propelled vehicles or other machines such as self-propelled or riding lawn mowers, snow-throwers, and lawn or garden tractors are known. Electric drive systems for such vehicles or machines typically employ an automatic fail-safe or parking brake in association with an electric drive motor which drives one or more axles.

It would be advantageous to be able to release the fail-safe brake to allow the vehicle to be towed or otherwise moved, e.g. for servicing the vehicle, when it is not in operation or the batteries are discharged.

SUMMARY OF THE INVENTION

This invention relates to an assembly useful in association with electric drive systems for self-propelled vehicles or machines having a fail-safe or parking brake mechanism comprising an auxiliary battery-powered brake release assembly.

This invention also relates to a self-propelled vehicle or machine having an electric drive system comprising a fail-safe brake in association with an auxiliary battery-powered brake release assembly.

DETAILED DESCRIPTION OF THE INVENTION

An example of a self-propelled vehicle that can be modified in accordance with this invention is described in U.S. Patent Application Publication No. 2009/0065273, filed as Ser. No. 12/209,120 on Sep. 11, 2008, the entire disclosure of which is incorporated herein by reference.

Figure 1:
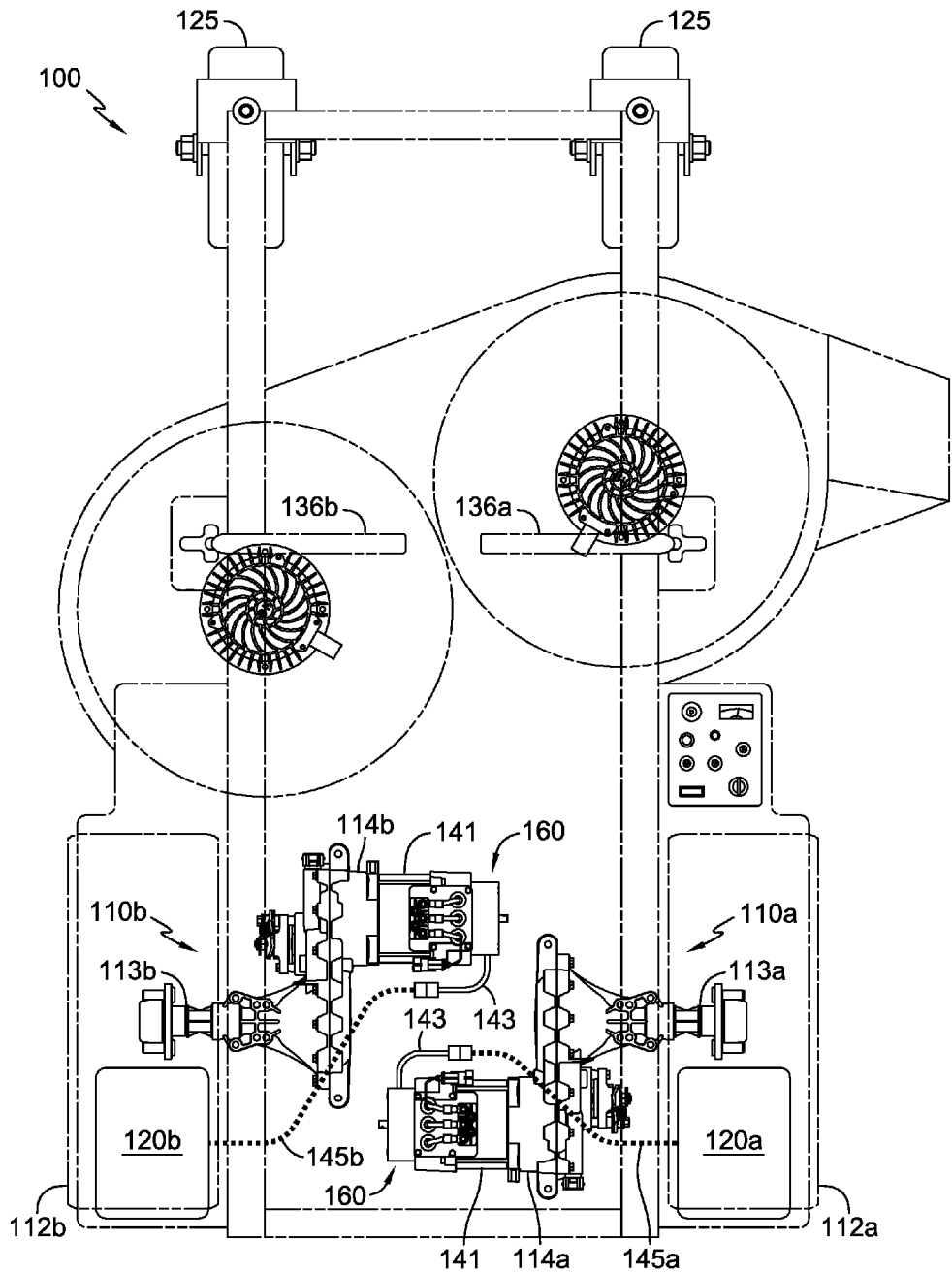
FIG. 1 is a top plan view of a vehicle in the form of a riding lawn mower to which one or more principles or aspects of the present invention may be applied.

Turning now to the figures, wherein like reference numerals refer to like elements, FIG. 1 illustrates a utility vehicle in the form of mowing vehicle 100, that can be modified to incorporate one or more principles of the present invention. Power supply (not shown) of vehicle 100 drives an electric motor 141 on each of two electric transaxles, 110a and 110b, each separately driving one of two rear wheels 112a and 112b, to implement zero turn vehicle functionality. A pair of pivoting front casters 125 is also provided to facilitate zero turn vehicle functionality. The transaxles drive the wheels 112a and 112b via axle shafts 113a and 113b, which are coupled to transmissions 114a and 114b, which are driven by electric motors 141. A fail-safe brake 160 is joined to each of the electric motors 141, preventing movement of the vehicle, for example, when it is powered down. In this embodiment, the electric transaxles 110a and 110b are nested in a side-by-side, parallel arrangement as shown in FIG. 1. A brake release assembly in accordance with the principles of the invention can be modified to be useful with a lawn tractor having only one electrically driven transaxle incorporating a single fail-safe brake as described herein.

Figure 2:
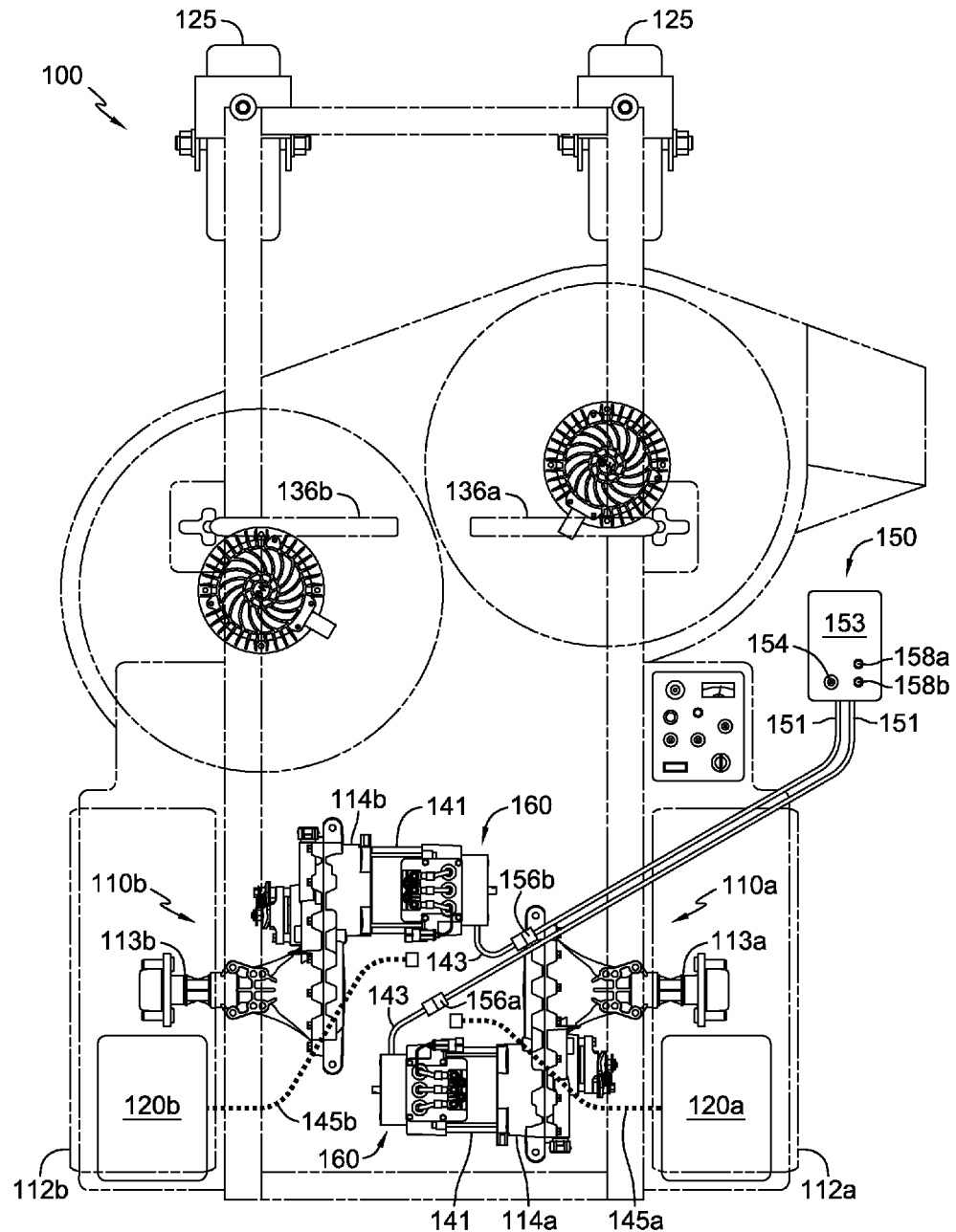
FIG. 2 is a top plan view of the vehicle depicted in FIG. 1 showing application of one or more principles of the present invention.

Referring to FIGS. 1 and 2, mowing vehicle 100 may include one or more brake systems. In the embodiment shown, switches (not shown) are opened when steering/drive levers 136a and 136b are both positioned in a neutral, drive-disengaged position, allowing the engagement of fail-safe brakes 160. Similarly, when drive levers 136a and 136b are both positioned in the neutral, drive-disengaged position, those same switches (or a separate set of switches) may also signal or initiate a blade stop function as a safety and power management feature.

In the mode shown in FIG. 1, fail-safe brake leads 143 extend from fail-safe brakes 160 to controller leads 145a and 145b, providing electrical communication between the fail-safe brakes 160 and controllers 120a and 120b. Drive controllers 120a and 120b may control electrical communication from a vehicle power source, such as a battery (not shown), to the fail-safe brakes 160. Each fail-safe brake 160, which is biased to braking engagement, is preferably of a conventional, electro-mechanical kind in which springs (not shown) press a brake plate, friction disk or the like (not shown) into braking engagement, arresting the rotation of the motor shaft (not shown) of an electric motor 141, to which it is engaged. In a vehicle driving mode, electrical current from the vehicle power source passes through the controllers 120a and 120b to energize coils (not shown) in the fail-safe brakes 160, thereby releasing the brake plate or friction disk from braking engagement.

FIG. 2 shows the connection of fail-safe brakes 160 to brake release assembly 150. As shown in FIG. 2, when the connections between fail-safe brakes 160 and controllers 120a and 120b are manually broken, and battery pack case 153 and battery pack leads 151 are connected to fail-safe brake leads 143, the closing of switch 154 releases fail-safe brakes 160. In the mode shown in FIG. 2, the electrical current from battery pack case 153 energizes coils (not shown) in brakes 160 that oppose the springs and release brakes 160. The brake release assembly 150, which may be used periodically to release brakes 160 when the main power supply is depleted, for example, may be a hand held device or may be permanently mounted on vehicle 100.

Figure 3:
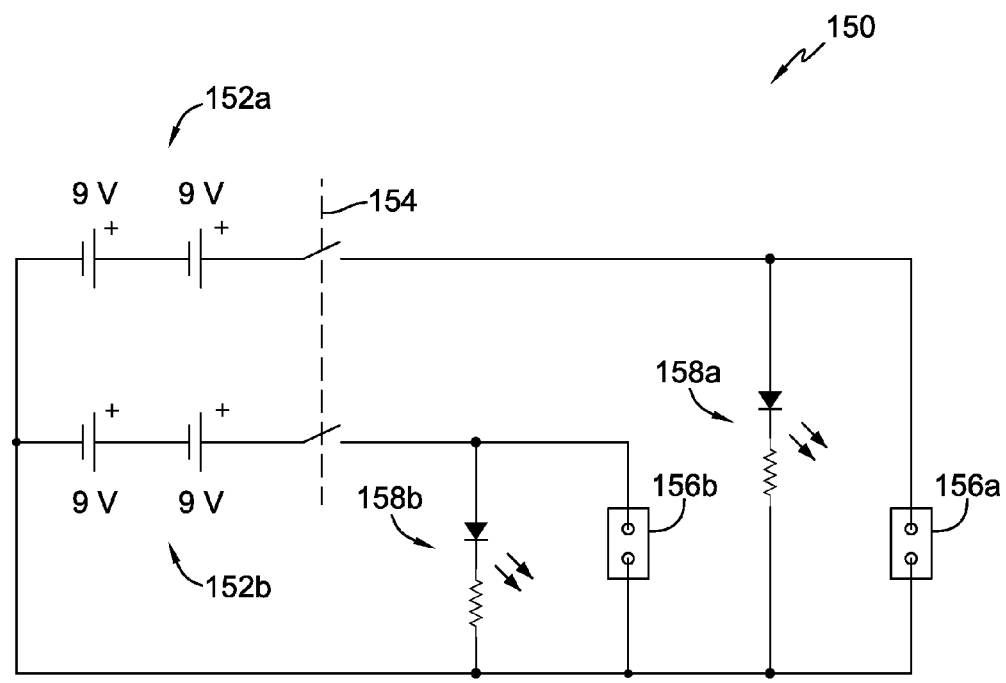
FIG. 3 is a schematic diagram of a battery-powered brake release circuit useful in the present invention.

FIG. 3 shows the circuit details of brake release assembly 150, comprising a pair of switchable circuits connecting a power source 152a and 152b in parallel with a light-emitting diode (LED) 158a and 158b and an external connector 156a and 156b, respectively. External connectors 156a and 156b are joined to the pair of switchable circuits by battery pack leads 151 (as best shown in FIG. 2), which may be of varying length to allow for the access requirements of different vehicles. As illustrated, both circuits are controlled by a double pole single throw (DPST) switch 154, though other switch types or number of switches may be employed as known in the art. Switch 154 may be mounted to the exterior of battery pack case 153. In FIG. 3, each power source 152a and 152b is depicted as a pair of batteries in series, specifically a set of 9V batteries. While the use of 9V batteries is shown for convenience, other batteries and voltages may be employed as determined by the demand or requirements of fail-safe brakes 160. Power sources 152a and 152b are contained within battery pack case 153. Each LED 158a and 158b may be mounted to the exterior of battery pack case 153 and serves as an indicator that fail-safe brakes 160 have been released. However, conventional lamps or bulbs could be used in each circuit as indicators.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention.

What is claimed is:

1. An auxiliary power unit capable of energizing a pair of fail-safe brakes that arrest the rotational output of a pair of electric transaxles mounted to a vehicle, each electric transaxle having a separate electric motor engaged to one of the pair of brakes, and each brake having an external electrical connector and requiring electrical power to assume a non-braked state that permits free rotation of its respective electric motor, the auxiliary power unit comprising:
    a first switchable circuit comprising a first power source connected in parallel with a first visual indicator and a first electrical connector compatible for connection with the external electrical connector of one of the brakes;
    a second switchable circuit comprising a second power source in parallel with a second visual indicator and a second electrical connector compatible for connection with the external electrical connector of the other of the brakes; and
    a switch in electrical communication with the first and second switchable circuits, wherein when the switch is closed:
        the first and second power sources are electrically connected to the first and second visual indicators, respectively; and
        the first and second power sources supply the electrical power to the first and second electrical connectors, respectively, such that the brakes assume the non-braked state when the first and second electrical connectors are connected with the external electrical connectors of the brakes.

2. The auxiliary power unit of claim 1, further comprising a case enclosing the first and second power sources.

3. The auxiliary power unit of claim 1 wherein the first and second visual indicators comprise light-emitting diodes.

4. The auxiliary power unit of claim 1, wherein the switch is a double pole single throw switch.

5. The auxiliary power unit of claim 1, wherein the first power source and the second power source comprise a plurality of batteries.

6. The auxiliary power unit of claim 1, wherein the auxiliary power unit is configured to be mounted to the vehicle.

7. The auxiliary power unit of claim 1, wherein the first electrical connector and the second electrical connector comprise two-wire connectors.

8. The auxiliary power unit of claim 2, wherein the first and second visual indicators are mounted on the exterior of the case.

9. The auxiliary power unit of claim 2, wherein the switch is mounted on the exterior of the case.

10. The auxiliary power unit of claim 2, wherein the first and second electrical connectors are external to the case and communicate electrically with first and second switchable circuits, respectively, through a pair of extended leads.

11. The auxiliary power unit of claim 5, wherein each of the plurality of batteries comprises a 9V cell.

12. A vehicle comprising:
    a pair of electric transaxles driving a pair of output shafts, each electric transaxle comprising an electric motor;
    a pair of fail-safe brakes each engaged to one of the electric motors, each fail-safe brake having an external electrical connector for receiving electrical power, wherein each fail-safe brake arrests the rotational output of one of the pair of electric transaxles and requires the electrical power to assume a non-braked state that permits free rotation of the electric motor engaged to the brake; and
    an auxiliary power unit comprising:
        a first switchable circuit comprising a first power source connected in parallel with a first visual indicator and a first electrical connector compatible for connection with the external electrical connector of one of the brakes;
        a second switchable circuit comprising a second power source connected in parallel with a second visual indicator and a second electrical connector compatible for connection with the external electrical connector of the other of the brakes; and
        a switch in electrical communication with the first and second switchable circuits.

13. The vehicle of claim 12, wherein the auxiliary power unit further comprises a case enclosing the first and second power sources.

14. The vehicle of claim 12, wherein the first and second visual indicators comprise light-emitting diodes.

15. The vehicle of claim 12, wherein the switch is a double pole single throw switch.

16. The vehicle of claim 12, wherein the first power source and the second power source comprise a plurality of batteries.

* * * * *